(12) United States Patent
Brown et al.

(10) Patent No.: US 6,381,339 B1
(45) Date of Patent: Apr. 30, 2002

(54) IMAGE SYSTEM EVALUATION METHOD AND APPARATUS USING EYE MOTION TRACKING

(76) Inventors: Winton Emery Brown, 533 Eastbrook La., Rochester, NY (US) 14618; Jeff Bennett Pelz, 23 Hadley Ct., Pittsford, NY (US) 14534; C. Andrew Hilgartner, 2413 North East St., Kirksville, MO (US) 63501

( * ) Notice: Subject to any disclaimer, the term of this patent is extended or adjusted under 35 U.S.C. 154(b) by 0 days.

(21) Appl. No.: 09/005,108

(22) Filed: Jan. 9, 1998

Related U.S. Application Data

(60) Provisional application No. 60/035,516, filed on Jan. 15, 1997.

(51) Int. Cl.[7] .............................................. G06K 9/00
(52) U.S. Cl. .................................... 382/100; 382/103
(58) Field of Search ................................. 382/103, 117, 382/100; 396/51; 351/209, 210, 246, 203, 202; 348/77, 78

(56) References Cited

U.S. PATENT DOCUMENTS

| 3,883,235 | A | * | 5/1975 | Lynn et al. | 351/246 |
|---|---|---|---|---|---|
| 4,479,784 | A | * | 10/1984 | Mallinson et al. | 434/43 |
| 4,789,235 | A | * | 12/1988 | Borah et al. | 351/246 |
| 4,859,050 | A | * | 8/1989 | Borah et al. | 351/210 |
| 4,931,865 | A | * | 6/1990 | Scarampi | 348/2 |
| 4,973,149 | A | * | 11/1990 | Hutchinson | 351/210 |
| 5,220,361 | A | * | 6/1993 | Lehmer et al. | 351/226 |
| 5,341,181 | A | * | 8/1994 | Godard | 351/209 |
| 5,345,944 | A | * | 9/1994 | Hongo et al. | 600/555 |
| 5,491,757 | A | * | 2/1996 | Lehmer et al. | 382/128 |

OTHER PUBLICATIONS

Noton et al, Eye Movements and Visual Perception, Scientific American, pp. 34–43, Jun, 19.*

Bunch, P. C. Hamilton, J.F., Sanderson, G. K., Simmons, A.H.: "A Free–Response Approach to the Measurement and Characterization of Radiographic–Observer Performance," Journal of Applied Photographic Engineering, 1978, vol. 4, No. 4, pp. 166–171.

Marr, David: "Vision, A Computational Investigation into the Human Representation and Processing of Visual Information," W.H. Freeman & Company, San Francisco, 1982, pp. 3–36, 41–101.

Kundel, H.L., Nodine, C.F., Krupinski, E.A.: "Computer–Displayed Eye Position as an Aid to Pulmonary Nodule Interpretation," Investigative Radiology, 1990, vol. 25, pp. 890–896.

Krupinski, E.A., Nodine, C.F., Kundel, H.L.: "Enchancing Recognition of Lesions in Radiographic Images Using Perceptual Feedback", Society of Photo–Optical Instrumentation Engineers, Mar., 1998, vol. 37(3), pp. 813–818.

Hilgartner, C.A., Randolph, J.F.: "Psycho–Logics, An Axiomatic System Describing Human Behavior," Journal of Theoretical Biology, 1969, vol. 23, pt. 1, pp. 285–337, pt. 2, pp. 347–374.

Phillips, R.A.: "Information for Manufacturers Seeking Marketing Clearance of Digital Mammography Systems", Computed Imaging Devices, Office of Device Branch, Division of Reproductive, Abdominal, Ear, Nose, Throat, and Radiological Devices Evaluation, Jun. 19, 1996.

Green, D.M., Swets, J.A.: "Signal Detection Theory and Psychophysics," 1966, New York, Wiley.

* cited by examiner

Primary Examiner—Yon J. Couso
(74) Attorney, Agent, or Firm—Jaeckle Fleischmann & Mugel, LLP

(57) ABSTRACT

Image systems are compared and evaluated using an eye-tracking apparatus. An observer views images made with different image systems. The eyetracking apparatus records the horizontal and vertical gaze position as a function of time.

The observer's judgments for one image system are compared to results for another image system.

1 Claim, 8 Drawing Sheets

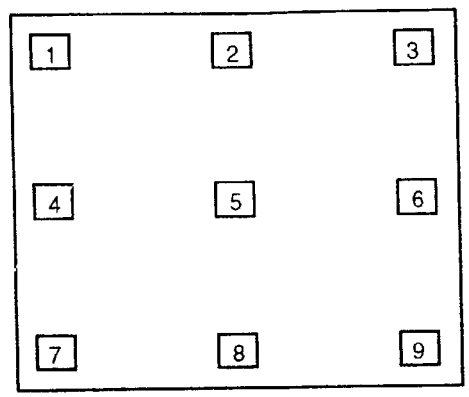
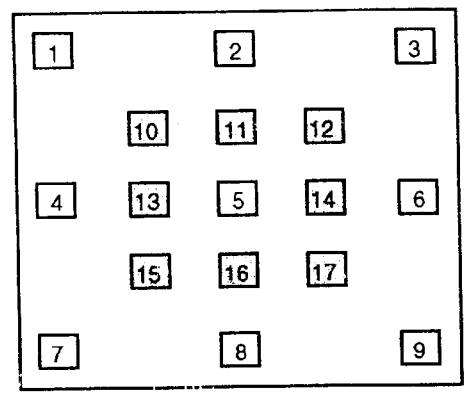
Fig. 6a        Fig. 6b
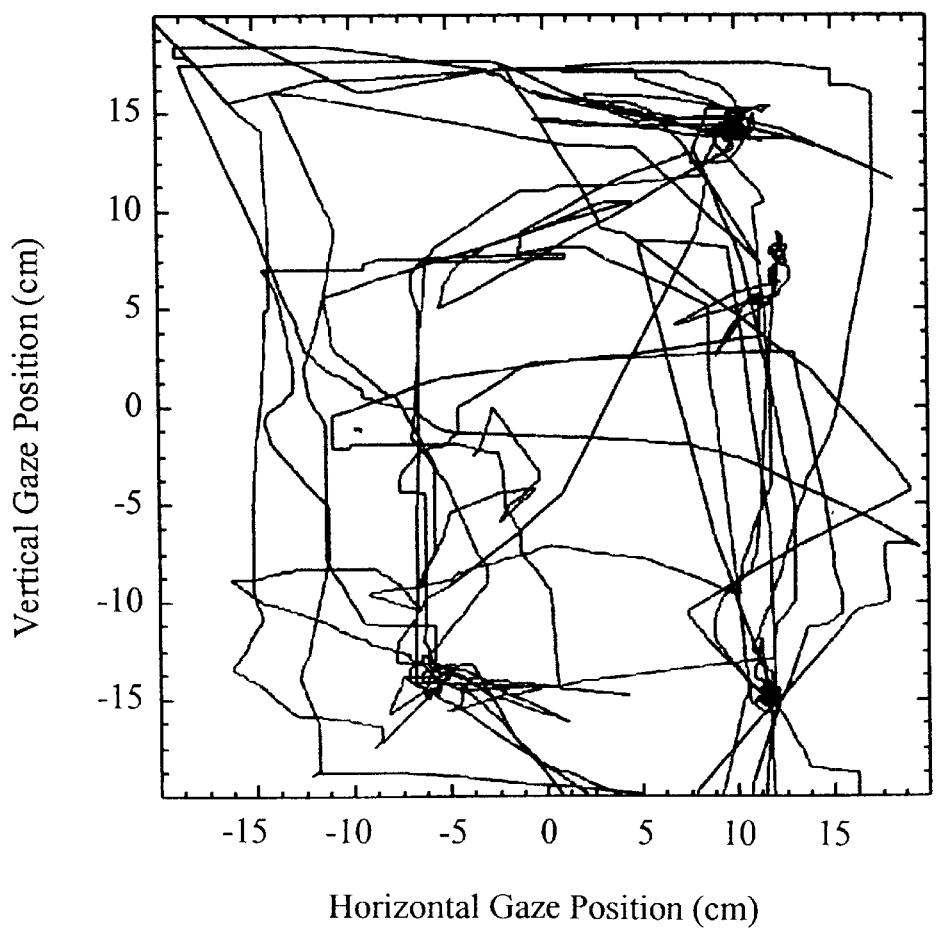
Fig. 7

IMAGE SYSTEM EVALUATION METHOD AND APPARATUS USING EYE MOTION TRACKING

This application claims benefit of provisional application 60/035,516, filed Jan. 15, 1997.

This invention relates in general to image systems, and in particular to methods and apparatus for evaluating image systems.

BACKGROUND

An image system is designed to capture an image of an object and to display the captured image to a user. Image systems are used for a variety of purposes. Many image systems are based on photographic technology including well known silver halide image capture and development techniques of conventional photography. The imaging radiation may be visible light, infrared light, of x-rays. Other image systems are digital in nature and rely upon semiconductor arrays for capturing an image. Digital imaging systems include digital cameras, digital radiography (including but not limited to digital mammography), optical character/image recognition systems, and scanners. Still other imaging systems rely upon dry photography, such as electrophotography.

Any image system must reliably display the captured image. However, it is difficult to measure the reliability and accuracy of an imaging system. It is also difficult to compare on type of image system to another. For example, will a digital mammography system identify tumors as well as, better or worse than a traditional silver halide system. One measuring technique relies upon observer testing where the observer is asked to identify objects in an image. Such techniques are flawed because they fail to account for false positives.

Since 1966 others have used Receiver Operator Characteristic (ROC) for threshold level detection experiments used for making likelihood ratio discriminations between true signal and false signal presentations in detection experiments with noise present. Methods are known for estimating the ROC from detection data. Other researchers have provided a mathematical framework in which it is possible to conceive of detection imaging as a two stage process of visual abstraction followed by a signal evaluation stage). In the early '70s the ROC method was found to be deficient in radiographic detection tasks because of the identifiability problem, namely:

1) One can never be certain whether a particular response was due to a signal or whether it was spontaneously generated.
2) Even if one were assured that a response was due to some signal, and if the signals come at all close together, one cannot be certain to which signal it was due.

Still others attempted to resolve the identifiability problem by constraining the sampling window and by requiring that the observer specify the location of the detected image. Multiple signal presentations were also used. Such localization experiments were similarly considered as unsuccessful since they had the effect of reducing the scale of the problem but the same identifiability problem was operative at the reduced scale. The multiple signal detection experiments were an improvement but they pointed to the use of a still greater number of signals the number of which should be chosen randomly.

The Free Response Experiment was a great improvement in the experimental design providing for a realistic statistical interpretive framework for radiographic detection experiments. The false positive were assumed to be locally Poisson distributed which makes sense for an imaging process which generates false positive images on randomly generated fields of noise or on structured medical noise. Researchers working with the Radiological Medicine Group at the Mayo Clinic generated thousands of FROC detection data on 5 mm circles embedded in random fields of radiographic mottle. It was estimated the parameters of a FROC curve which was a non-linear relationship between the false positive rate and the corresponding fraction of true positive detected and scored with the appropriate ROC rating.

One researcher and coinventor of this invention, Winton Brown, independently noted that there were potentially serious ill-conditioned inference problems in the estimation procedures for the FROC parameters. This made it impossible to estimate the ROC parameters separate from the imaging rate parameters. Brown concluded that there were two columns of data missing which were necessary to estimate the ROC parameters from the FROC experiment. which were related to visual system affects arising from the deconvolution of image data from the radiographic mottle noise field. (True Negative imaging events and errors in the imaging of the True Positive events). Brown assumed that these were due to statistical behavior arising in the visual search and image abstraction process.. Estimating of the ROC from FROC data would require precision eyetracking, a technology which Dr. Harold Kundell was working with in tracking scan paths and saccades in teaching Radiographic Medicine.

Brown has described the problems with measuring the ROC from Free Response data and provided a formalized theoretical framework for understanding the problem of visual detection in fields of noise. He recommended using precision eyetracking to gather data in Free Response detection experiments.

SUMMARY/DETAILED DESCRIPTION/ DRAWINGS

We have demonstrated the Free Response detection on his Applied Science Lab ASL 4000 SU, video based infrared LED Eyetracker. Our experiment indicated that the full range of imaging events and ROC statistics could readily be generated with the eyetracking instrument. We conducted a Threshold level Detection Experiment that is a comprehensive technique for measuring the image quality of an imaging system. That technique can be used throughout the field of Experimental Radiology and other imaging systems for determining the improvements in system detection performance.

The proposed uses for this technique are in general application of ROC type radiographic detection experiments specifically determining the detection performance as a function of the physical properties of the radiographic system. The technique has several applications:

1) Determine the suitability of the FDA standards for testing to determine the acceptability of a Mammography Radiographic System. (W. Moore, E.K. Co.)
2) Determine the effect of film contrast on the ability of a Radiologist to detect lesions in Mammography. (W. Wolski, E.K. Co.)
3) Determine the capability of computer aided Mammography when compared with human observers.

DRAWING

FIG. 6a illustrates a nine point calibration;

FIG. 6b illustrates a 17 point calibration;

FIG. 7 is a graph of a scan path analysis of vertical vs. horizontal gaze positions;

MONITORING GAZE POSITION

Figure 1:
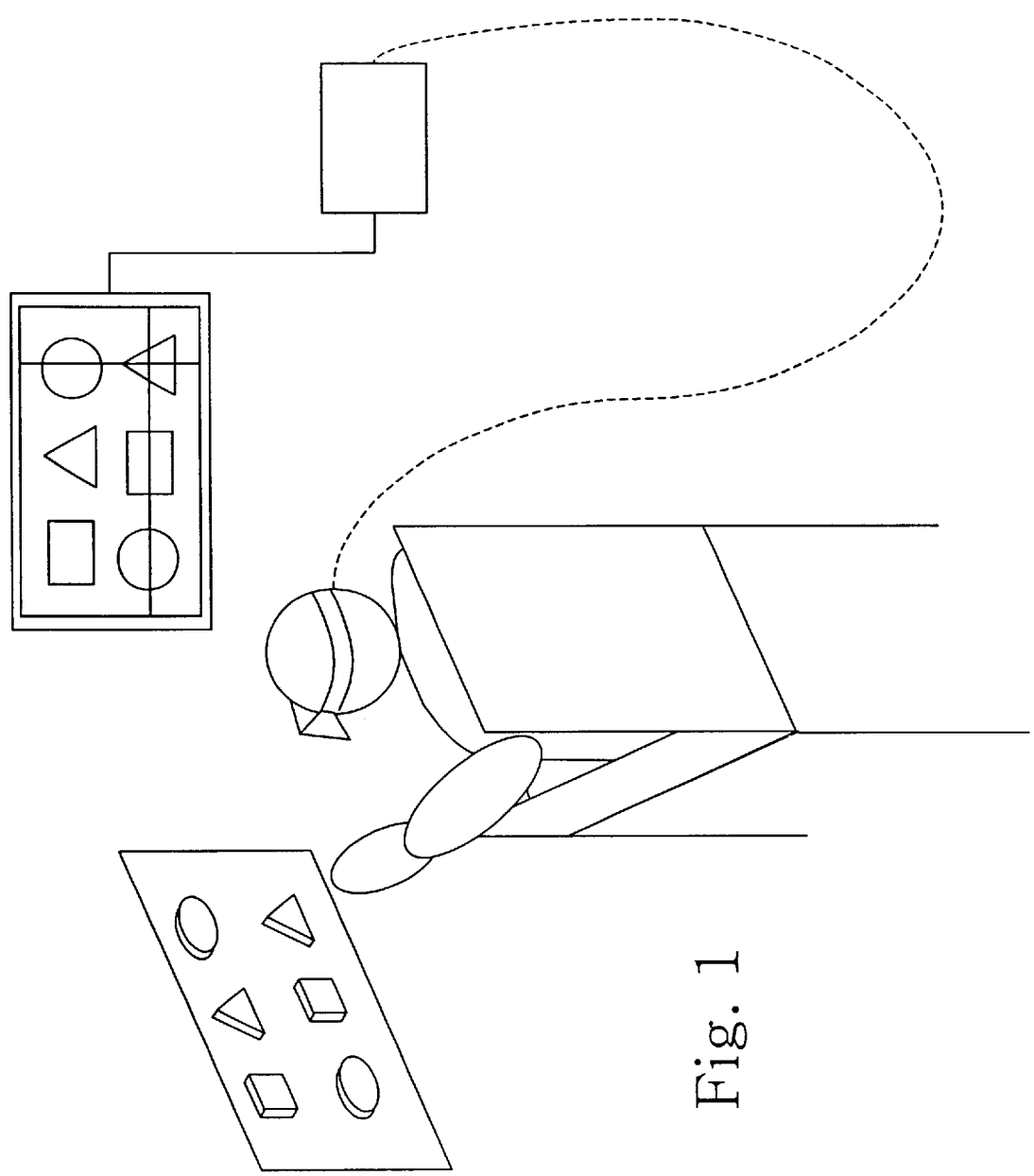
FIG. 1 is a photograph of a user wearing an apparatus of the invention.

The human eye exhibits extreme anisotropy in visual acuity; the fovea, a small region in the center of the eye's visual field, has densely packed photoreceptors and high-density neural connections via the optic nerve. Outside the central fovea, resolution drops off sharply. As a result, human observers performing visual and/or visuo-motor tasks make frequent, rapid movements of the eye, repeatedly moving the direction of gaze to foveate a portion of the scene. Depending on the task, up to five such eye movements can be made every second, at rotational velocities approaching 1000°/sec. Because of the need to foveate items and/or details in such tasks, an externally observable marker for visual attention is available by monitoring the point of gaze.

Some method of determining an observer's point of gaze on the target is required for the disclosed process. Observers performing natural tasks typically move their point of gaze by moving their eyes and head in a coordinated sequence of movements. Artificially stabilizing the head in order to simplify the task of determining the observer's gaze direction affects performance, and can result in eye movement patterns substantially different than those made under natural viewing conditions. As a result, it is important that a method allowing natural eye and head movements be employed. Manual methods designed to determine the point of gaze such as requiring the observer to indicate his/her position of gaze on the target with a pointer are awkward, and observers are often unable to report gaze position accurately. Other methods, such as restricting the observer's field of view via a mask and/or limited illumination will not allow natural visual search.

A method of tracking the observer's gaze is therefore necessary. Many methods have been devised to achieve this, though it is only in recent years that methods allowing accurate measurements of gaze direction during natural behavior have become available. Among the methods available for monitoring the orientation of the eye in the head are:

Direct observation—The experimenter views the observer's eye (or views a film or video record of the observer's eye) and attempts to determine the gaze direction. Only rough estimates of gaze position are possible (e.g., quadrant determination).

Scleral coils—A small coil of wire is attached to a scleral contact lens and worn by the subject. Currents induced by static or dynamic magnetic fields are read and used to calculate the eye's position and orientation.

Limbus trackers—The borders between the limbus and iris are tracked, typically by IR photodiode arrays. By monitoring the position of the horizontal and vertical scleral borders, eye position can be deduced.

Purkinje image trackers—One or more of the Purkinje images (reflections from the air/cornea, cornea/aqueous humor, aqueous humor/eyelens, and/or eyelens/vitreous humor) interfaces are tracked. Tracking one image provides a measure related to the eye's rotation and translation; tracking more than one of the images allows rotation and translation movements to be separated for analysis. While very accurate and precise, the method requires that the head be artificially stabilized.

While any one of these or other methods could be used to track the eye, our current work has made use of video-based, infrared-illuminated, headband mounted eyetrackers. Combined with a method for monitoring head position and orientation in real-time, these trackers allow natural movements of the eye, head, and torso while providing adequate accuracy and precision (~0.5/0.1°). Head movement was monitored with a six degree of freedom magnetic field tracker, though any method could be used (e.g., optical, ultrasound, video tracking, mechanical linkage employing optical, mechanical, or electrical position sensors, gyroscopic, accelerometer, etc.).

Figure 2B:
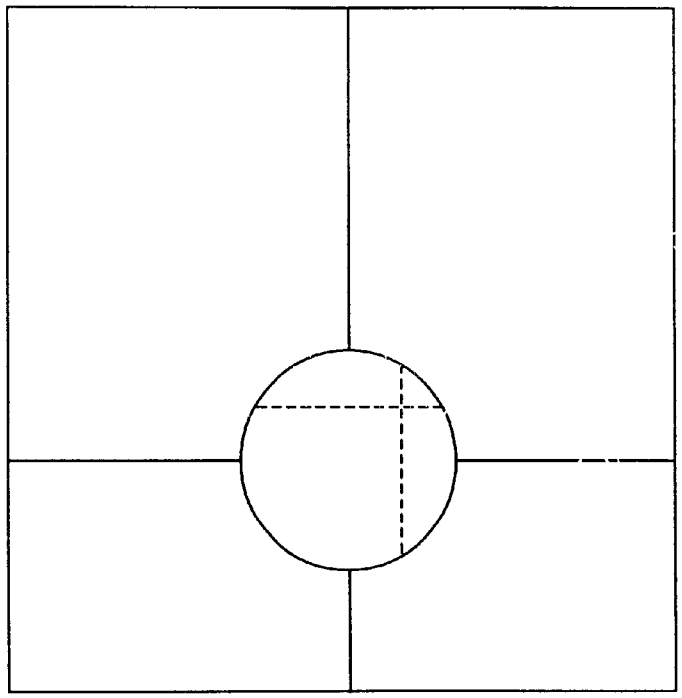
FIG. 2b shows crosshair mark centroids of pupil and first Purkinje image computed by the tracker.
Figure 2A:
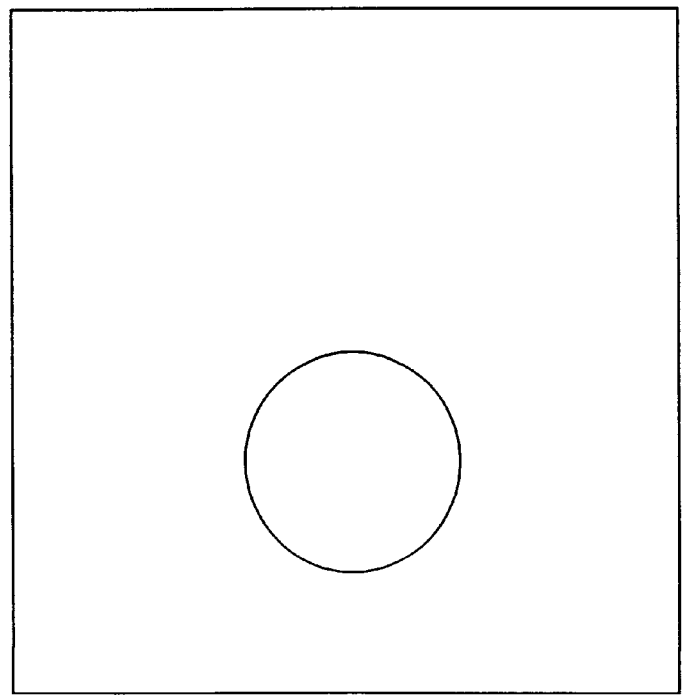
FIG. 2a is a raw video from a headband mounted "eye camera" showing bright pupil and first Purkinje image.

Monocular eye position was monitored with an Applied Science Laboratories ('ASL') Model E4000SU eyetracker and a lab computer. The ASL is a headband mounted, video-based, IR reflection eyetracker (FIG. 1 shows the eyetracker in use). A collimated infrared emitting diode (IRED) illuminates the eye, resulting in a 'bright-pupil' retroreflection from the subject's retina, and a first surface reflection at the cornea (the first Purkinje image). A monochrome CCD camera (without the standard IR rejection filter) is aligned coaxially with the illuminator to image the eye. FIG. 2a) shows the bright-pupil and first Purkinje images as captured by the eye-camera. The eye-camera image is digitized and thresholded at two levels in real-time by the eyetracker's control unit. The two threshold levels are adjusted manually so that pixels within the bright pupil are above threshold at one level, while only those pixels within the corneal reflection are above threshold at the second level. The centroid of the pupil and first Purkinje image are then computed by the lab computer. The control unit overlays crosshairs indicating the pupil and first Purkinje centroids on the image from the eye camera FIG. 2b) shows the resulting image as displayed on the 'eye monitor.'

Tracking both pupil and first Purkinje images makes the system less sensitive to movement of the tracker with respect to the head because translation of the eye's image (caused by headband movement) causes both pupil and first Purkinje images to move together, while rotation causes differential motion of the two centroids. To reduce eye movement artefacts due to headband movement, eye-in-head position is calculated based on the relative location of the two centroids whenever both are present in the eye-camera image. If the system loses the first Purkinje image, eye position is calculated based on the pupil image alone until the first Purkinje image is re-acquired.

Because the system is video-based, eye position signals are limited to 60 Hz when a single interlace field is used for each eye position computation, or 30 Hz when a full frame (odd and even interlace fields) is used.

Gaze position (integrated eye-in-head and head-position and orientation) is calculated by using the eye-in-head signal described above and a head position/orientation signal from a magnetic field head-tracker that monitors the position and orientation of the head. An Ascension Technology magnetic field tracker (Model 6DFOB) was used to monitor the position and orientation of the head and the hand. The transmitter unit was mounted above and in front of the subject's head. The transmitter contains three orthogonal coils that are energized in turn. The receiver unit contains three orthogonal 'antennae' coils which detect the transmitters' signals. Position and orientation of the receiver are determined from the absolute and relative strengths of the transmitter/receiver coil pairs. The position of the sensor is reported as the (x, y, z) position with respect to the transmitter, and orientation as azimuth, elevation, and roll angles.

Figure 3:
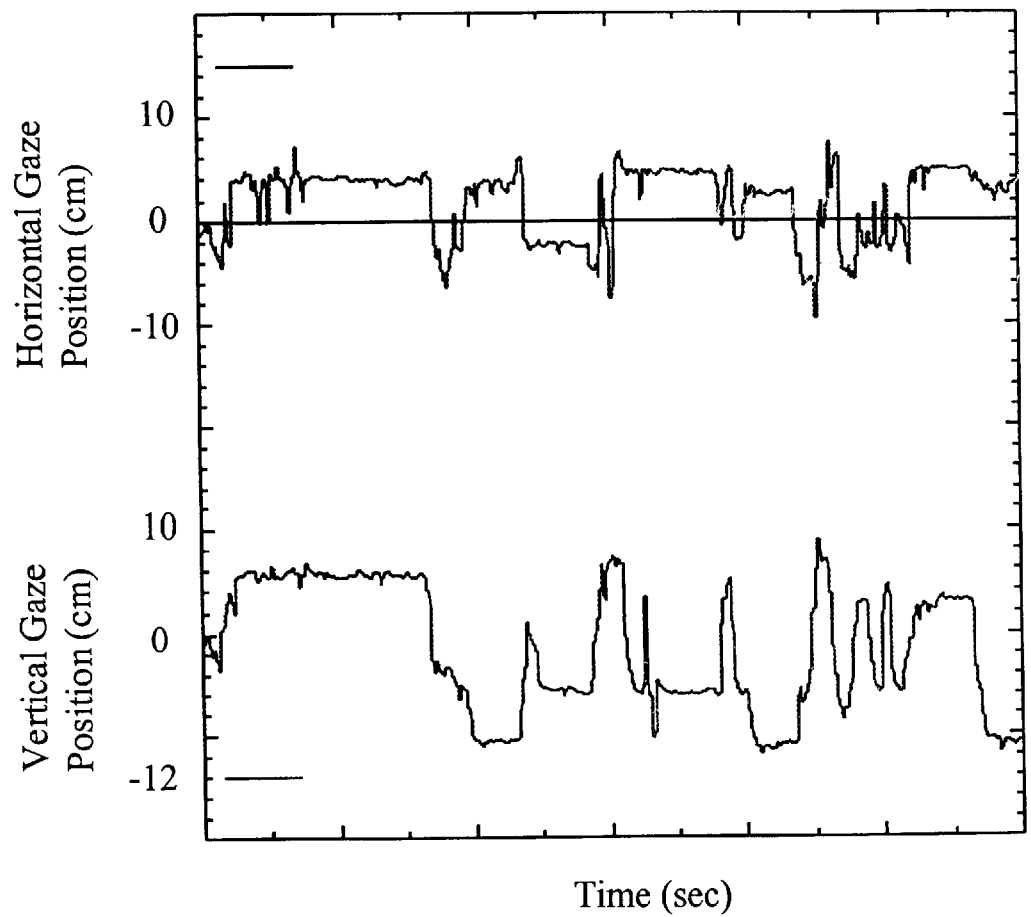
FIG. 3 is a plot of horizontal and vertical gaze positions as a function of time for a sample run of the method.

The eyetracker reports gaze position as the (x,y) intersection of the line-of-sight with the working plane. The digital data stream containing eye-in-head, head orientation and position, and gaze intercept are read from the eyetracker. The digital data stream is collected on a computer for storage and analysis. FIG. 3 shows a plot of horizontal and vertical gaze position as a function of time for a sample run of the disclosed process.

Figure 4:
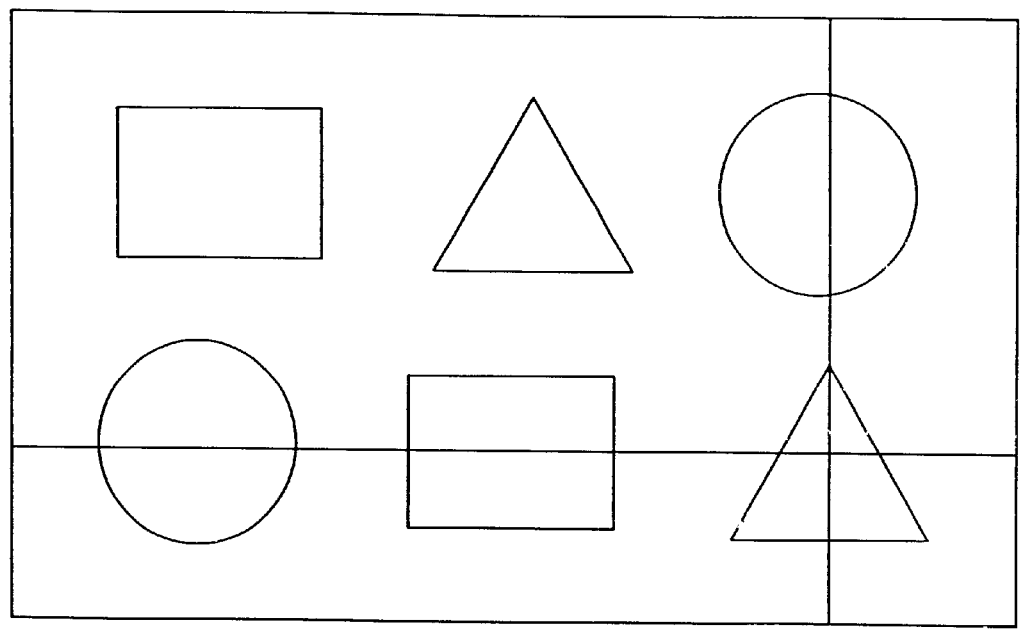
FIG. 4 is a video frame from the eyetracker scene monitor showing crosshair overlay on the image from the scene camera.

In addition to this digital data stream, the eyetracker provides a video record of eye position. The headband holds a miniature "scene-camera" to the side of the subject's head, aimed at the scene (see FIG. 1). The eyetracker creates a crosshair overlay indicating eye-in-head position that is merged with the video from the scene-camera, providing a video record of the scene from the subject's perspective on the scene-monitor, along with a crosshair indicating the intersection of the subject's gaze with the working plane (see FIG. 4). Because the scene-camera moves with the head, the eye-in-head signal indicates the gaze point with respect to the world. Head movements appear on the record as full field image motion. The scene-camera can be fitted with a range of lenses to match the field of view to the specific task.

Figure 5:
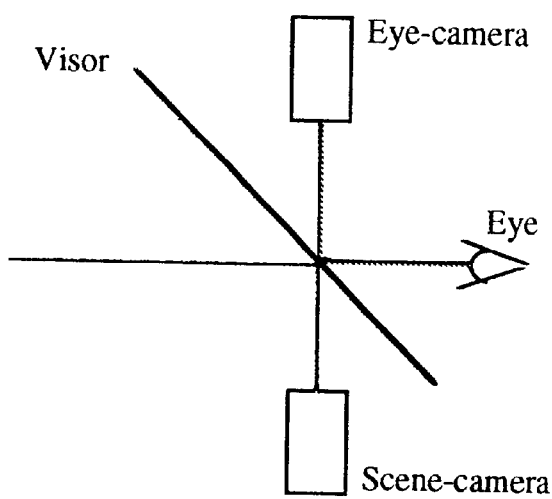
FIG. 5 is a schematic diagram of an alternate arrangement of the scene camera for reducing parallax error.

If the scene camera is not coaxial with the line of sight, calibration of the video signal is strictly correct for only a single distance. All gaze points are in the plane of the working board, and subjects typically do not change their distance from the board substantially, so the parallax error is not significant in this task, though it can be significant in tasks not constrained to a near-vertical plane. The parallax error can be eliminated by repositioning the scene-camera below the visor so that it is collinear with the eye-camera (see FIG. 5). While this orientation eliminates parallax error, it severely restricts the field of view of the scene-camera. In addition, image contrast and chroma are reduced due to the poor reflectance within the visible spectrum and flare from the IRED illuminator.

The eye-in-space signal calculated by the eyetracker by integrating the eye-in-head and head position/orientation signals is not affected by parallax—the scene camera is used only during calibration when the distance to the scene is fixed. After initial calibration, the gaze intersection is calculated by projecting the eye-in-head position onto a 'virtual calibration plane' at the same distance as the calibration plane during calibration. The vector defined by the eye center and the intersection with the 'virtual plane' is then rotated based on the head position/orientation signal, and projected onto the working plane.

The eyetracker must be calibrated for each subject before each trial session to ensure optimal accuracy. Calibrating the eyetracker requires three steps—1) entering the position of the calibration plane's reference points, 2) locating the calibration points (9 or 17 points; see FIG. 6), and 3) recording the subject's pupil and first Purkinje centroids as each point in the calibration target is fixated.

In the final step, the observer's head is steadied and s/he is instructed to fixate each calibration target in turn, so that raw pupil and first Purkinje images can be collected at each point. The calibration function is determined by an algorithm based on the known target positions and the raw pupil and corneal reflection positions. The calibration can be performed with 9 or 17 points, as shown in FIG. 6. The 17-point calibration target increases accuracy by allowing the target points to cover a larger area while reducing the area over which eye-position data must be interpolated. The 17-point target is especially critical when the scene-camera is fitted with a wide-angle lens that suffers from barrel distortion.

For each trial, the subject was seated, fitted with the eyetracker, and calibrated. The image under test (the 'plate') was placed on a light box approx 50 cm from the observer. The observer was instructed to view the plate at his/her own pace, and to report to the experimenters any targets. Along with reporting that a target had been located, the observer reported a 'confidence' measure (1,2,3, or 4 in this experiment, though any scale could be used). In addition to reporting the signal detection verbally, the observer also pressed a key on the computer, which caused the value to be stored in the digital data stream. While a keypress was used in this case, any method of signaling the detection confidence could be used (e.g., rotary encoder, joystick position, slider, etc.).

Figure 8:
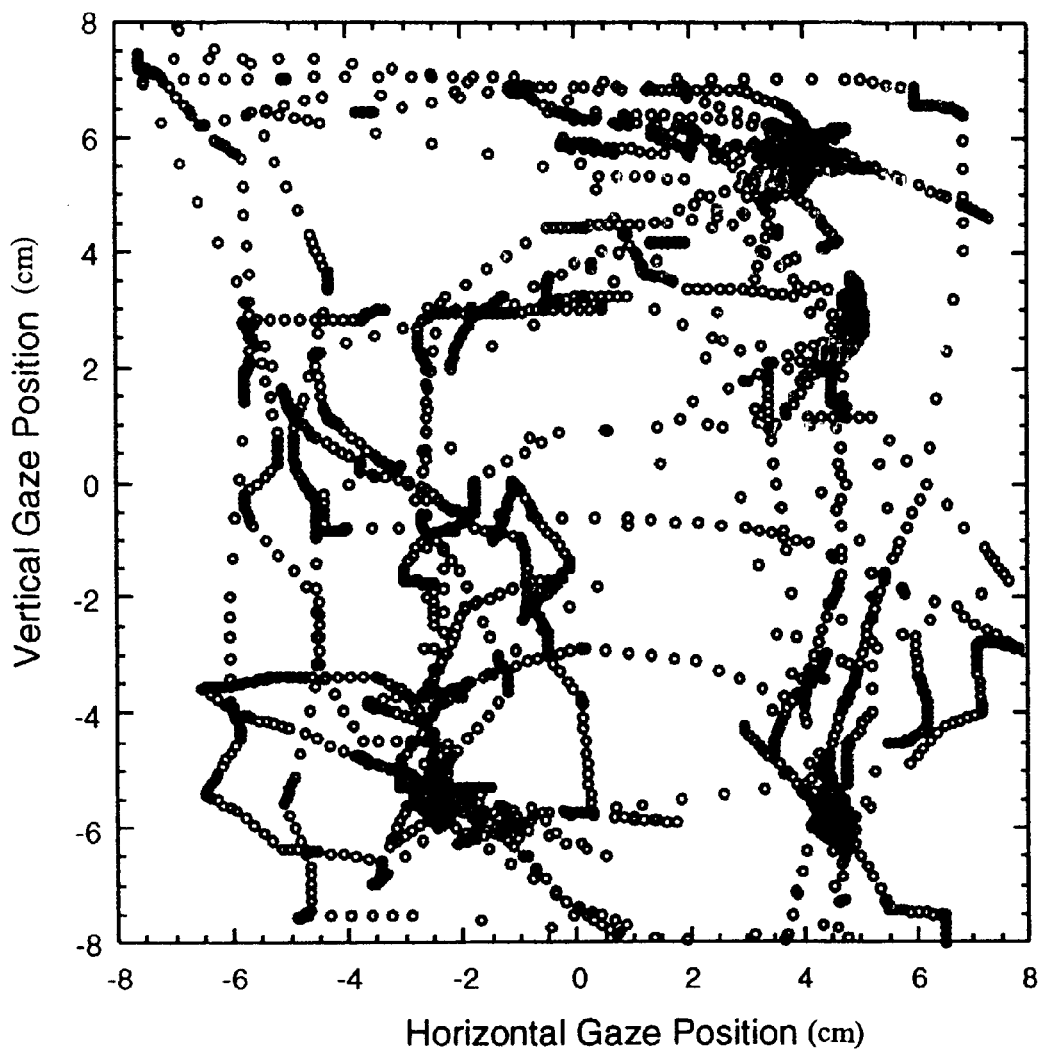
FIG. 8 is a graph of fixation density showing vertical vs. horizontal gaze position projected onto the image plane.
Figure 9:
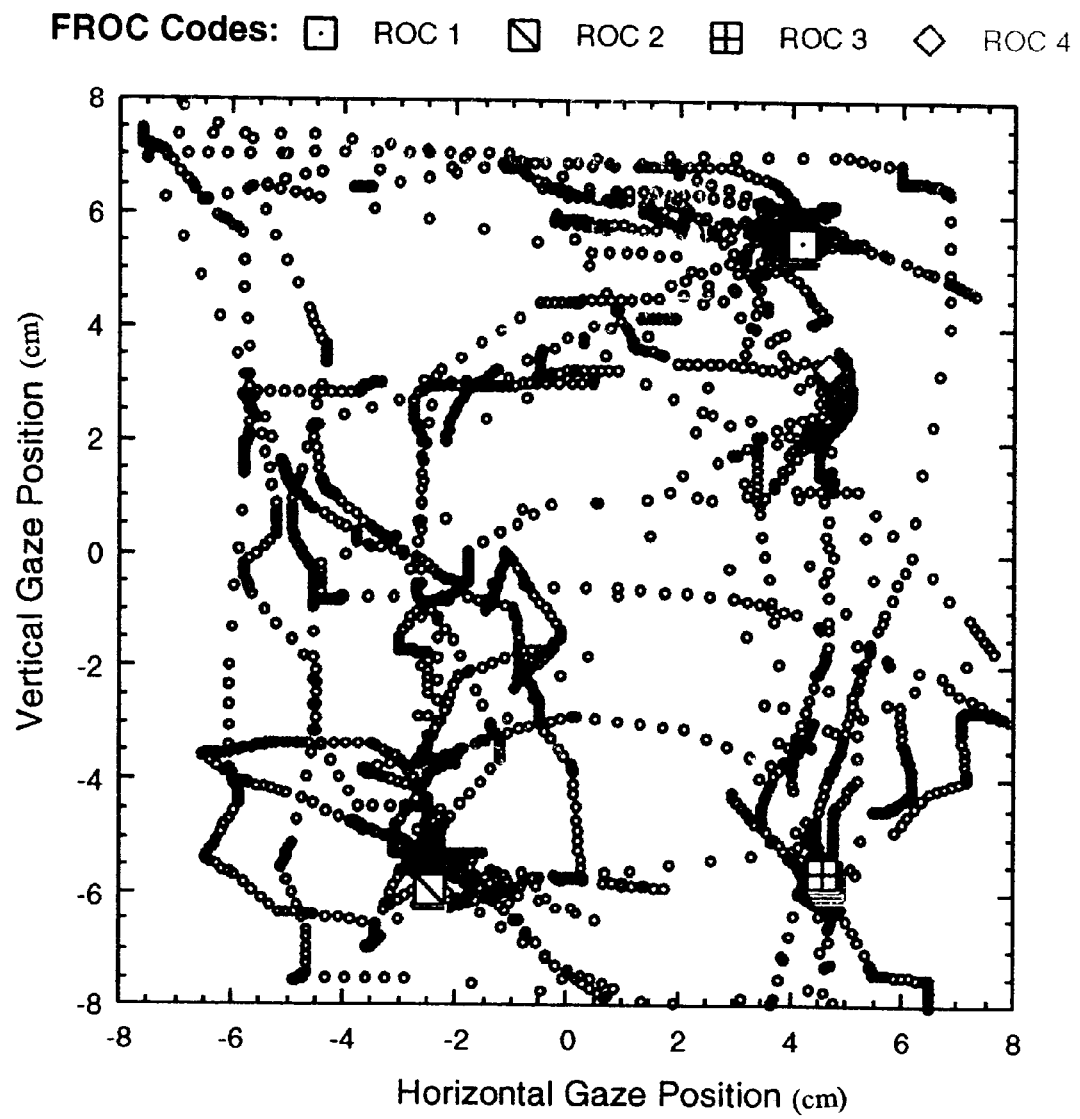
FIG. 9 is a graph of fixation density showing FROC response indicators.

FIG. 3 shows the horizontal and vertical eye position as a function of time for a 60 second trial. FIG. 7 shows the same data plotted as a scanpath—vertical vs. horizontal gaze in the plane. FIG. 8 shows the same data plotted in terms of the fixation density throughout the trial. The regions that attracted the longest fixations are more easily identified in such a plot. FIG. 9 shows the fixation density, along with a graphical indication of the FROC confidence rankings entered during this period of the trial.

Figure 10:
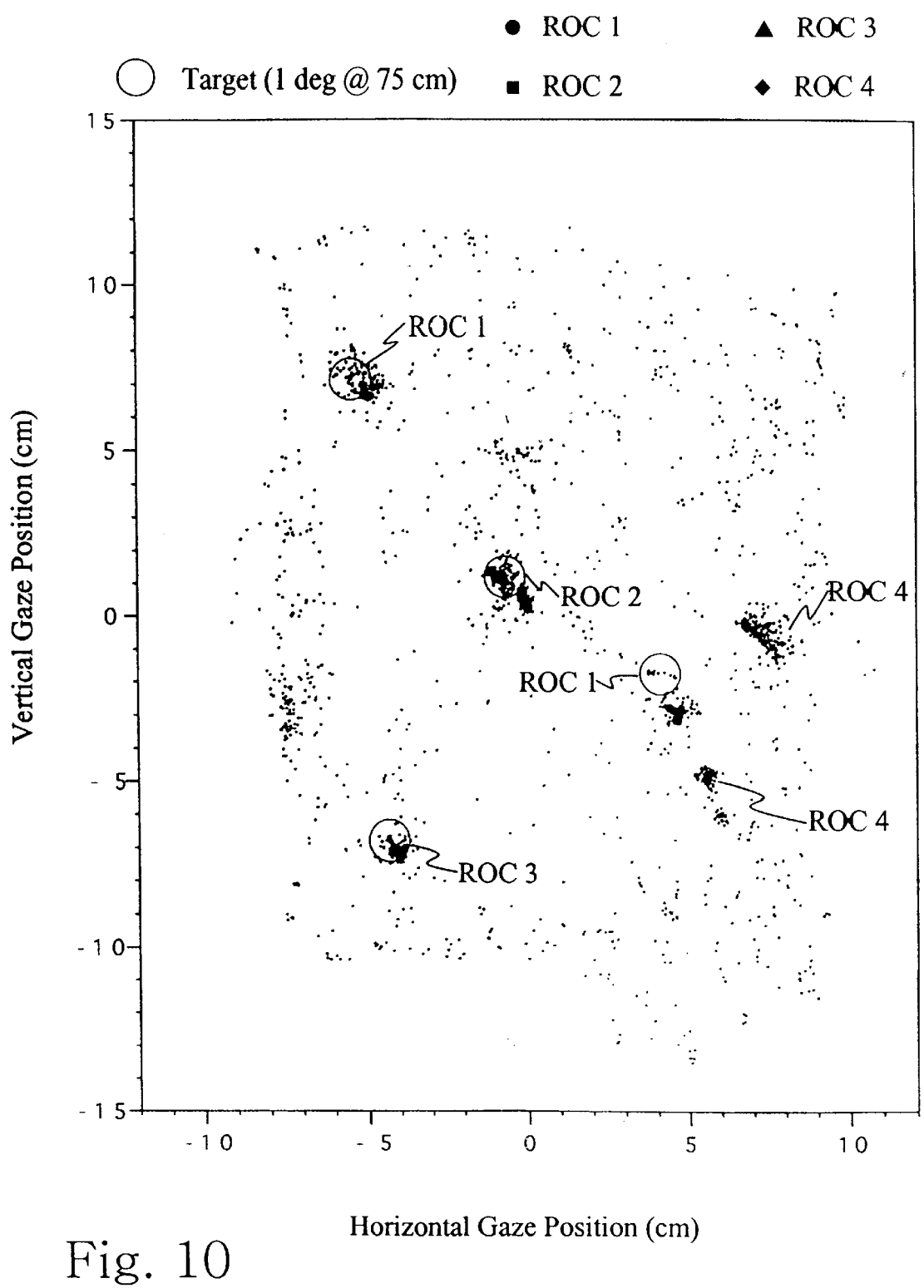
FIG. 10 is a graph of the results of the demonstration of the ASL 4000 SU as described in the specification.

A demonstration of the Applied Science Laboratory ASL 4000 SU, video based, infrared LED Eyetracker with demonstration FROC plates from our previous work in 1982 was made. The eyetracking instrument was calibrated and demonstrated on the #1 FROC plate. Plate #1 had four true signal presentations of a five millimeter circle with 0" of obscurating lucite for maximum observation clarity of the image. The experiment succeeded in searching out and abstracting all of the four true signal on the plate and scoring them with an ROC value coded as Blue: High likelihood, Green: Medium likelihood, Brown: Low Likelihood, Red: Marginal likelihood. (see FIG. 10). The dot distributions show eye gaze locations for every 1/10th of a second interval throughout the observation session. The dot patterns tend to cluster around imaging events which tend to attract foveal visual attention. The registration tends to be slightly off and is due to calibration error. There are two areas of dot clusters on the right side indicated with a Red ROC mark indicating a marginal likelihood of true signal presentation. These are categorized as false positive detection events. The cluster located at (−8, −3) we considered to be a true negative event. The other cluster at (0,5) is also possibly a true negative event. On this plate there was no false negatives or negative imaging events of a true signal presentation.

Another experiment used Plate #3 which has nine true signal presentations and has 2" of obscurating lucite which raises the noise level and tends to obscure the 5 mm circles. That experiment found five of the true signal presentations and generated four false positives.

A third experiment again tried Plate #3. The head gear was readjusted and a recalibration of the system was performed. The observer learned how to use the equipment with very little practice and proceeded to find four of the true signal presentations and also generated four false positives.

OTHER APPLICATIONS

The invention may be applied to a number of imaging applications. These include but are not limited to:

(1) calibration of computer image enhancement algorithms;
(2) measurement of image quality;
(3) analysis of photo-interpretation of reconnaissance imagery;
(4) industrial radiology;
(5) measuring how image data affects a visual search process;
(6) measuring how a person processes visual information;
(7) training individuals to perform visual inspection and/ or tasks based on visual inspection;
(8) treating a research on metal illness, especially testing a treatment of illnesses such a schizophrenia where visual image identification is and tracking is a measure of the illness.

What we claim is:

1. A method for using an eyetracking apparatus for comparing a first imaging system to a second imaging system by comparing an observer's judgements about one or more targets imaged in the first imaging system with the observer's judgements about the targets imaged in the second imaging system, including the steps of:

providing the observer with first and second images of first and second targets imaged by corresponding first and second imaging systems, each image containing target signal data and noise;

tracking the movements of the eyes and head of the observer with an eyetracking apparatus in order to generate data on the horizontal and vertical gaze positions as a function of time for the gaze of the observer on the images;

recording observer judgments on where the image contains true target signal data;

comparing the observer judgements to reference target signal data locations to determine whether the observer has made one or more true positive, false positive, true negative, or false negative judgements;

correlating the observer judgments to data on the horizontal and vertical gaze positions as a function of time for the gaze of the observer on the images in order to identify the gaze data that correspond to the true positive, false positive, true negative, or false negative judgements of the observer;

comparing results of one image system to the other.

* * * * *